United States Patent
Xia et al.

(10) Patent No.: US 12,452,923 B2
(45) Date of Patent: Oct. 21, 2025

(54) TRIGGERED TXOP SHARING WITH AC LIMITATION

(71) Applicants: SONY GROUP CORPORATION, Tokyo (JP); SONY CORPORATION OF AMERICA, New York, NY (US)

(72) Inventors: Qing Xia, Santa Jose, CA (US); Li-Hsiang Sun, San Jose, CA (US); Liangxiao Xin, Santa Clara, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 350 days.

(21) Appl. No.: 18/198,079

(22) Filed: May 16, 2023

(65) Prior Publication Data
US 2024/0008081 A1  Jan. 4, 2024

Related U.S. Application Data
(60) Provisional application No. 63/367,389, filed on Jun. 30, 2022.

(51) Int. Cl.
*H04W 74/0816*  (2024.01)
*H04W 84/12*  (2009.01)

(52) U.S. Cl.
CPC ........ *H04W 74/0816* (2013.01); *H04W 84/12* (2013.01)

(58) Field of Classification Search
CPC ............. H04W 74/0816; H04W 84/12; H04W 74/085; H04W 72/569
See application file for complete search history.

(56) References Cited

U.S. PATENT DOCUMENTS

| | | | |
|---|---|---|---|
| 2018/0176951 A1 | 6/2018 | Li | |
| 2022/0279601 A1* | 9/2022 | Xue | .................. H04W 74/0816 |
| 2022/0353910 A1* | 11/2022 | Lu | ....................... H04W 74/006 |

FOREIGN PATENT DOCUMENTS

| | | |
|---|---|---|
| WO | 2022051311 A1 | 3/2022 |
| WO | 2022114468 A1 | 6/2022 |

* cited by examiner

*Primary Examiner* — Kyaw Z Soe
(74) *Attorney, Agent, or Firm* — O'BANION & RITCHEY LLP; John P. O'Banion

(57) ABSTRACT

A wireless protocol allowing an AP to allocate time within a transmit opportunity (TXOP) to non-AP stations. The allocations are made under condition that the non-AP STA(s) will satisfy Access Class (AC) requirements communicated in a frame sent by the AP STA, such as within an MU RTS TXS Trigger frame. Upon receiving the frame, the non-AP responds on whether it can meet the conditions, such as within a Clear-To-Send (CTS) message. If the non-AP can meet the conditions, then it proceeds to transmit data (to the AP, or a peer non-AP). Otherwise, if it cannot meet the conditions, then the AP can communicate the allocation to another non-AP STA. There are also conditions for how the non-AP can aggregate data units into A-MSDUs.

25 Claims, 7 Drawing Sheets

HE User Infofield of MU RTS TXS Trigger Frame — 70

| AID12 | RU Allocation | Allocation Duration | Requested AC | TID Aggregation Limit | Reserved |
|---|---|---|---|---|---|
| 12 | 8 | 9 | 2 | 3 | 6 |

Bits:

FIG. 3

EHT User Infofield of MU RTS TXS Trigger Frame — 90

| AID12 | RU Allocation | Allocation Duration | Requested AC | TID Aggregation Limit | Reserved | PS160 |
|---|---|---|---|---|---|---|
| 12 | 8 | 9 | 2 | 3 | 5 | 1 |

Bits:

FIG. 4

TRIGGERED TXOP SHARING WITH AC LIMITATION

CROSS-REFERENCE TO RELATED APPLICATIONS

This application claims priority to, and the benefit of, U.S. provisional patent application Ser. No. 63/367,389 filed on Jun. 30, 2022, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

STATEMENT REGARDING FEDERALLY SPONSORED RESEARCH OR DEVELOPMENT

Not Applicable

BACKGROUND

1. Technical Field

The technology of this disclosure pertains generally to wireless network communications and sharing of transmit opportunities (TXOPs), and more particularly to triggered TXOP sharing while controlling transmissions by Access Category (AC) and aggregation of non-AP transmissions.

2. Background Discussion

IEEE 802.11be is the next generation of mainstream standards and is the successor to IEEE 802.11ax/Wi-Fi 6 on the market today. The standard was created based on several candidate technologies, such as Multi-Link Operation (MLO) and Restricted Target Wake Time (R-TWT) MLO is a technology that enables simultaneous use of multiple links (frequency bands). For example, the 5 GHz and 6 GHz bands can be used simultaneously, increasing throughput in proportion to the number of links. MLO has an architectural structure in which each link has a corresponding physical layer and a lower MAC layer, which are bound together by a common upper MAC layer. This structure allows traffic passed from the application layer to be directed to any link (TID-to-Link Mapping). For example, by mapping traffic to links that are available for transmission or links that are less congested, it can reduce the latency caused by waiting for transmission. R-TWT is a technology that allows priority transmission of low-latency traffic through scheduling. R-TWT is based on the low-power consumption feature called TWT (Target Wake Time) specified in the previous generation 11ax. In TWT, the communication period between the access point and the terminal is determined in advance, and the terminal enters a doze (dozing) state during the remainder of the period, and when the period begins, the access point triggers the terminal to start communication. In R-TWT, the access point gathers information about the traffic handled by the terminal and periodically assigns a communication period to prioritize the terminal handling low-latency traffic.

Triggered the TXOP sharing procedure is one of the candidate technologies for 802.11be/Wi-Fi 7 (EHT) devices to access the channel, which could be applied during the R-TWT service period. The triggered TXOP sharing procedure allows an AP to allocate a portion of an obtained TXOP to one associated non-AP EHT STA for transmitting one or more non-TB PPDUs. An AP may transmit a MU-RTS TXS Trigger frame to an associated non-AP EHT STA with indicating the allocate time. The intention of sharing the TXOP is to aid associated non-AP EHT STAs in more easily transmitting Real Time Application (RTA) traffic that are time sensitive and usually have higher traffic priority without contending for channel access. However, there are no rules specified to further allocate the shared TXOP first to the prioritized traffic, other than low priority traffic, from the associated non-AP EHT STAs.

Accordingly, a need exists for an enhanced TXOP sharing protocol which overcomes present shortcomings. The present disclosure fulfills that need and provides additional benefits over existing systems.

BRIEF SUMMARY

A wireless communication protocol in which an Access Point (AP) station (STA) which has obtained a transmit opportunity (TXOP) can allocate time within the TXOP with one or more non-AP STAs which are able to satisfy Access Class (AC) requirements set by the AP within a frame transmitted by the AP. Upon receipt of this frame, the non-AP station sends a response back indicating if the requested AC requirements can be met. If the requested AC requirements are to be met by the non-AP STA, then the non-AP STA accesses the network and transmits data meeting the requested AC requirements. If the response back to the AP indicates that the non-AP cannot meet the conditions, then the AP can try to allocate the time to another non-AP STA. The protocol/apparatus also can control the aggregation of data units into A-MSDUs.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 3 and FIG. 4 illustrate data field diagrams of a Requested AC subfield and Traffic Identifier (TID) Aggregation Limit subfield added in both the High Efficiency (HE) and Extra-High Throughput (EHT) variants of the User Information field, such as within the MU RTS TXS Trigger frames, according to at least one embodiment of the present disclosure.

DETAILED DESCRIPTION

1. Problem Statement

The triggered TXOP sharing procedure as described in section of Draft specification P802.11be_D2.0 states: "The Triggered TXOP sharing procedure allows an AP to allocate a portion of the time within an obtained TXOP to an associated non-AP EHT STA for transmitting one or more non-TB PPDUs."

However, the specification is silent in regard to which associated non-AP STA should the AP select to share the portion of the obtained TXOP time. Thus, the AP lacks control of the transmissions, and is unable to fully control example quality of service (QoS) in one or more Access Classes (ACs) of data queued in the Enhanced Distributed Channel Access (EDCA).

Thus, the current specification is unable to perform TXOP sharing which is intended to aid non-AP STAs with their high priority AC traffic (e.g., time sensitive traffic) to transmit using the shared TXOP. Under those conditions, it would not be reasonable for an AP to send the MU RTS TXS frame to a non-AP STA that does not have buffered data units that meet the AC limitation.

It should be noted that that MU-RTS TXS Trigger frame is used by an EHT AP to allocate time within an obtained TXOP to an associated non-AP EHT STA to share this allocated time to that non-AP EHT STA.

2. Contribution of the Present Disclosure

In the current Draft specification P802.11be_D2.0, the MU RTS TXS Trigger frame only indicates the allocated time within an obtained TXOP to an associated non-AP STA, it does not specify any AC limitations on how the associated non-AP STA is to use the allocated time.

The present disclosure provides mechanisms for addressing the above shortcomings, such as the following.

In addition to allocating time within an obtained TXOP to an associated non-AP STA the AP can also indicate Access Class (AC) limitations on how the scheduled non-AP EHT STA is to use the allocated channel time. In at least one embodiment, this AC limitation information is carried by the MU RTS TXS trigger frame, although it may be carried through other type of communication frames without departing from the teachings of the present disclosure.

The non-AP STA receiving the MU RTS TXS trigger frame addressed to it should not use the shared TXOP if it does not have data units to transmit which meet the AC limitations. Thus, the AP can schedule other STAs which may have buffered units with AC equal to, or higher than, this AC limitation within the allocated time of the obtained TXOP.

Figure 1:
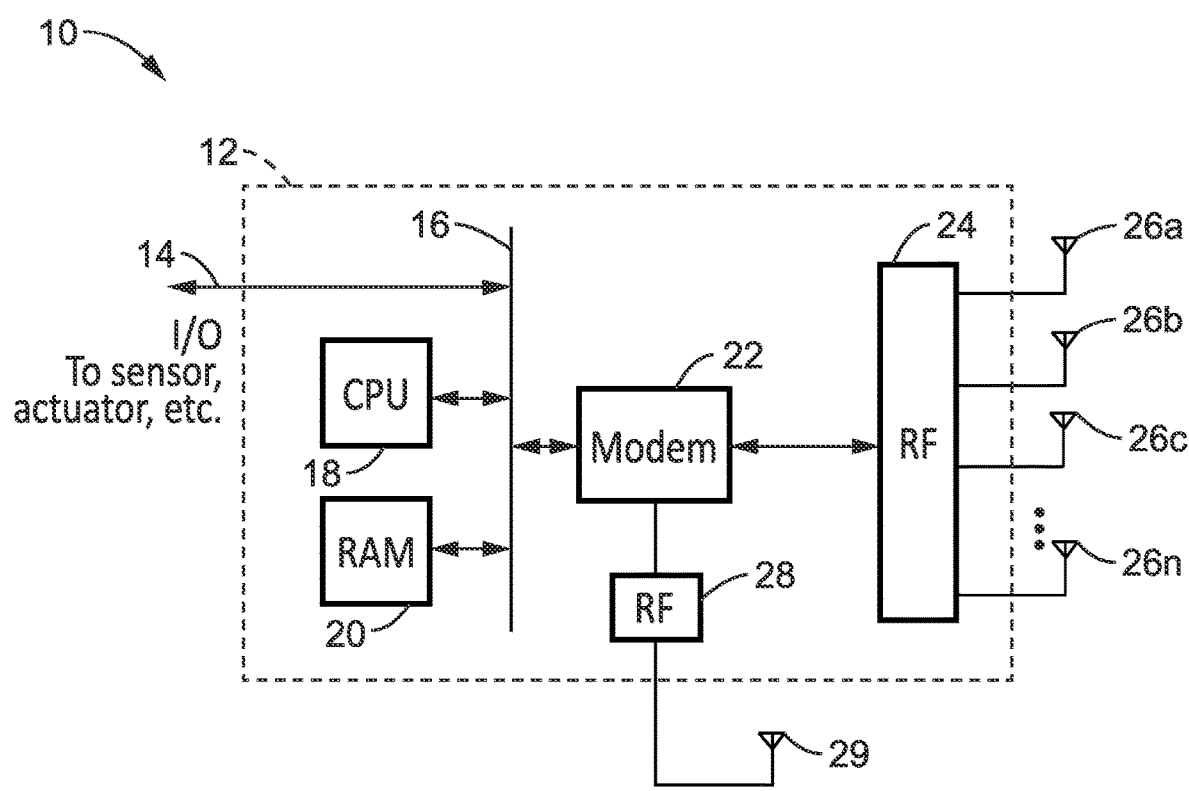
FIG. 1 is a block diagram of communication station hardware, according to at least one embodiment of the present disclosure.

3. Embodiments of the Present Disclosure 3.1. Communication Station (STA and MLD) Hardware FIG. 1 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the described communication protocol. The host machine accommodates at least one modem 22 to support communications coupled to at least one RF module 24, 28 each connected to one or multiple antennas 29, 26*a*, 26*b*, 26*c* through 26*n*. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 2:
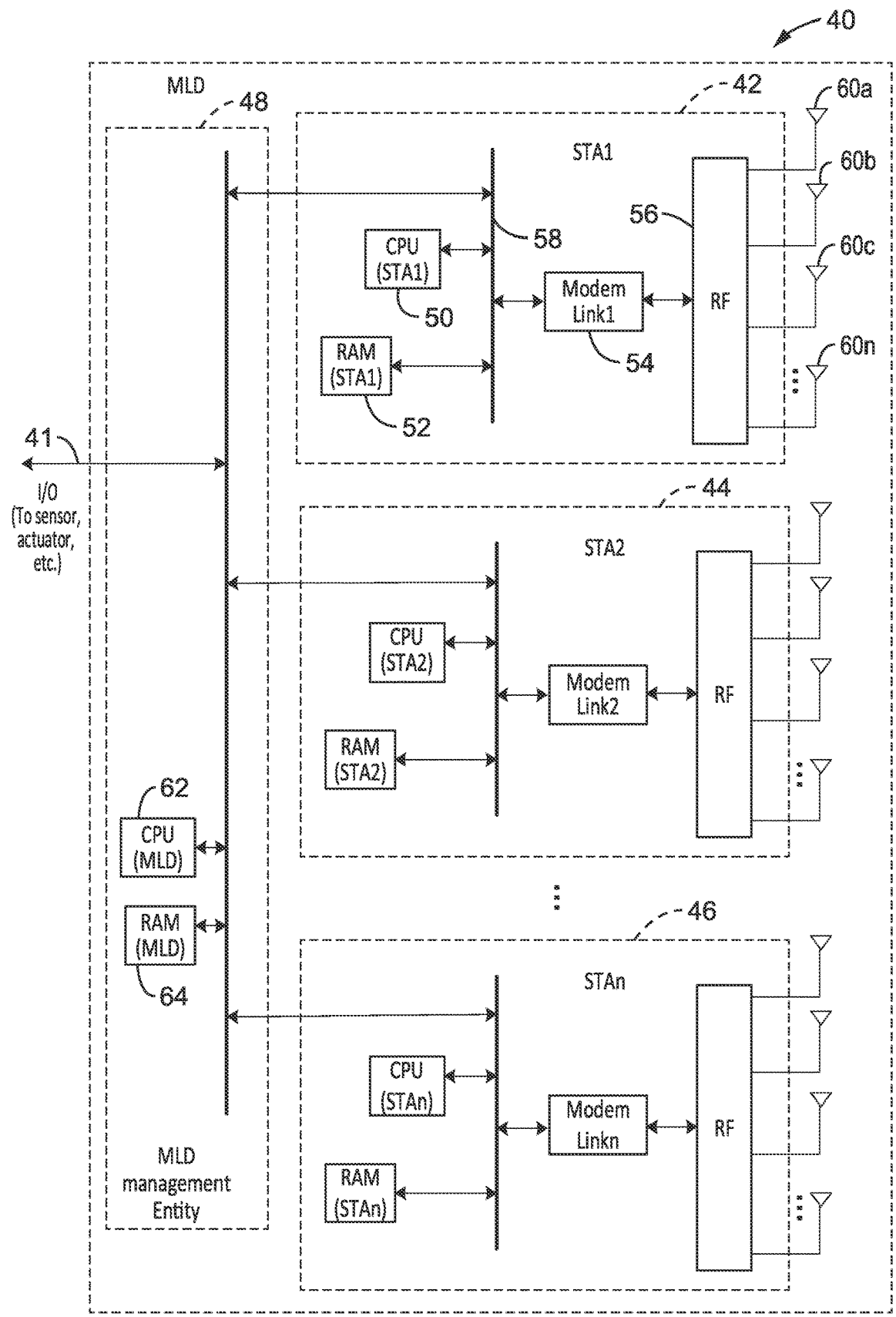
FIG. 2 is a block diagram of Multi-Link Device (MLD) hardware according to at least one embodiment of the present disclosure.

FIG. 2 illustrates an example embodiment 40 of a Multi-Link Device (MLD) hardware configuration. It should be noted that a "Soft AP MLD" is a MLD that consists of one or more affiliated STAs, which are operated as APs. A soft AP MLD should support multiple radio operations, for example on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4. MU RTS TXS Trigger Frame Format

FIG. 3 and FIG. 4 illustrate example embodiments 70, 90, of Multiple-User (MU) Ready-To-Send (RTS) Transmission (TXS) trigger frame format. As shown in these figures, a Requested AC subfield and TID Aggregation Limit subfield were added in both the High Efficiency (HE) and Extra-High Throughput (EHT) variants of the User Information field in the MU RTS TXS Trigger frames.

The Requested AC subfield indicates the requested AC Index (ACI) that the non-AP STA should assure it satisfies before accessing the allocated time in a portion of the TXOP obtained by the AP.

The TID Aggregation Limit subfield indicates MAC Protocol Data Units (MPDUs) allowed in an Aggregated-MPDU (A-MPDU) carried in the EHT or HE PLCP Protocol Data Unit (PPDU) and the maximum number of Traffic Identifiers (TIDs) that can be aggregated by the STA in the A-MPDU.

A non-AP EHT/HE STA that transmits a multiple-TID A-MPDU in the allocated time should aggregate Data frames in the following order. (i) First, any and all MPDUs are transmitted which correspond to the Requested AC subfield of the User Info field of the MU RTS TXS Trigger frame addressed to the STA. (ii) Then, any and all MPDUs are transmitted which correspond to any AC that has a higher priority than the Requested AC. (iii) It should be noted that that, the STA should not aggregate any MPDUs which correspond to ACs having a lower priority than the Requested AC.

A non-AP EHT/HE STA that transmits a single-TID A-MPDU in the EHT/HE PPDU in the allocated time should aggregate Data units in the following order: (i) A TID corresponding to the Requested AC subfield of the User Info field of the MU RTS TXS Trigger frame addressed to the STA; (ii) otherwise, a TID that corresponds to any AC that has a higher priority than the Requested AC; and (iii) the STA should not aggregate MPDUs that correspond to any AC that has lower priority than the Requested AC.

As an alternative to the above, the Trigger Dependent User Info subfield in the User Info field of the MU RTS TXS Trigger frame can be enabled. The Trigger Dependent User Info subfield should contain the Requested AC subfield as described above as well as the TID Aggregation Limit subfield.

It should be noted that in the current specification, the Trigger Dependent User Info subfield is not present in the MU-RTS Trigger frame.

The Triggered TXOP Sharing Mode subfield in the Common Info field is set to a first state (e.g., "1") if the MU-RTS Trigger frame is sent by an EHT AP that intends to allocate time within an obtained TXOP to an associated non-AP EHT STA for transmitting one or more non-TB PPDUs sequentially addressed only to its associated AP; The Triggered TXOP Sharing Mode subfield in the Common Info field is set to a second state (e.g., "2") if the MU-RTS Trigger frame is sent by an EHT AP that intends to allocate time within an obtained TXOP to an associated non-AP EHT STA for transmitting one or more non-TB PPDUs sequentially addressed to its associated AP or addressed to another STA; otherwise it is set to a fourth state (e.g., "0").

5. Operational Examples

5.1. Example 1

Figure 5:
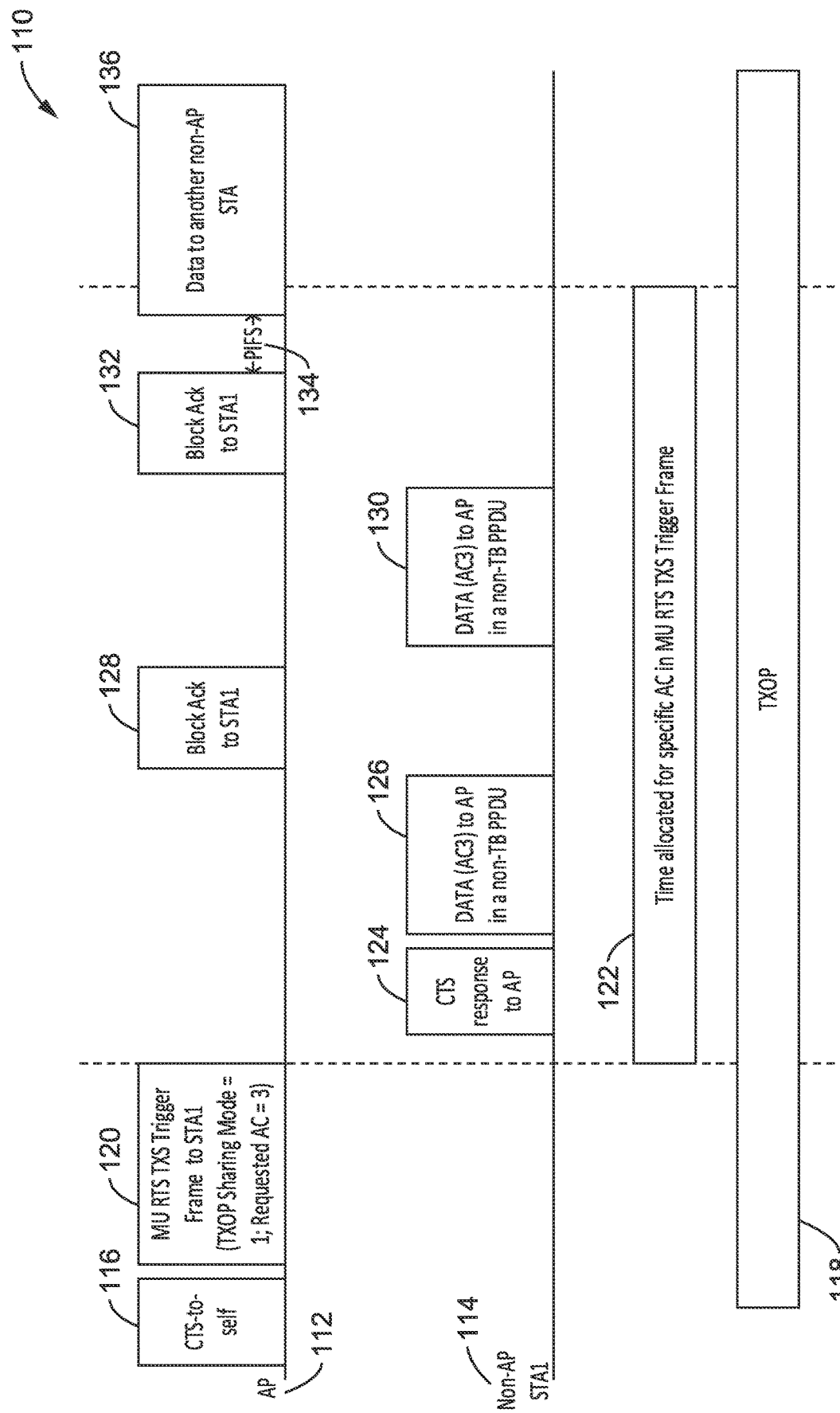
FIG. 5 is a communications diagram of using an MU RTS TXS Trigger frame with TXOP Sharing Mode subfield according to at least one embodiment of the present disclosure.

FIG. 5 illustrates an example embodiment 110 of using an MU RTS TXS Trigger frame with a TXOP Sharing Mode subfield. The example depicts interaction between AP 112 and non-AP STA 114, in particular in regard to sharing of TXOP 118 and more particularly to a time allocation 122 given toward a specific AC in the MU RTS TXS Trigger frame.

By way of example and not limitation, the TXOP Sharing Mode subfield value is equal to a first state (e.g., "1"), which means (indicates) that MU-RTS initiates MU-RTS TXOP sharing procedure wherein a scheduled STA can only transmit MPDU(s) addressed to its associated AP, and the Requested AC subfield value equals to a third state (e.g., "3") in soliciting UL PPDU of AC3.

The AP is seen performing a Clear-To-Send (CTS) 116 to self for reserving the channel. The EHT AP may allocate time within an obtained TXOP to non-AP STA1 to solicit UL PPDU which are at or above a certain AC level, for example AC3, by transmitting an MU RTS TXS Trigger frame 120 to non-AP STA1.

After non-AP STA1 receives the MU RTS TXS Trigger frame 120 addressed to it, it sends a CTS 124 to the AP. Then, the non-AP STA1 may transmit one or more non-trigger based (non-TB) Physical Layer Protocol Data Units (PPDUs), exemplified as 126 and 130 that satisfy the Requested AC (i.e., AC3) within the time allocation signaled in the MU RTS TXS Trigger frame. The AP acknowledges receipt of these PPDUs. To be able to satisfy the requested AC the non-AP STA1 has a buffered data unit with an AC equal to or larger than the requested AC.

The EHT AP receives the CTS from non-AP STA1, thus the AP recognizes that its transmission of the MU RTS TXS Trigger frame 120 was successful. The AP may also transmit a Block Ack 128 to non-AP STA1 as an immediate response of the reception of UL DATA 126 within the allocated time specified in the MU RTS TXS Trigger frame.

Then, non-AP STA1 may continue transmitting one or more non-TB PPDUs 130 that satisfy the Requested AC (i.e., AC3) within the time allocation signaled in the MU RTS TXS Trigger frame, and the non-AP should receive Block Ack 132 as a response from the AP.

After the AP sends Block Ack 132 to non-AP STA1, the CS mechanism indicates that the medium is idle at the TxP IFS 134 slot boundary, as indicated by PIFS. Then the EHT AP may transmit another PPDU 136 within the obtained TXOP.

5.2. Example 2

Figure 6:
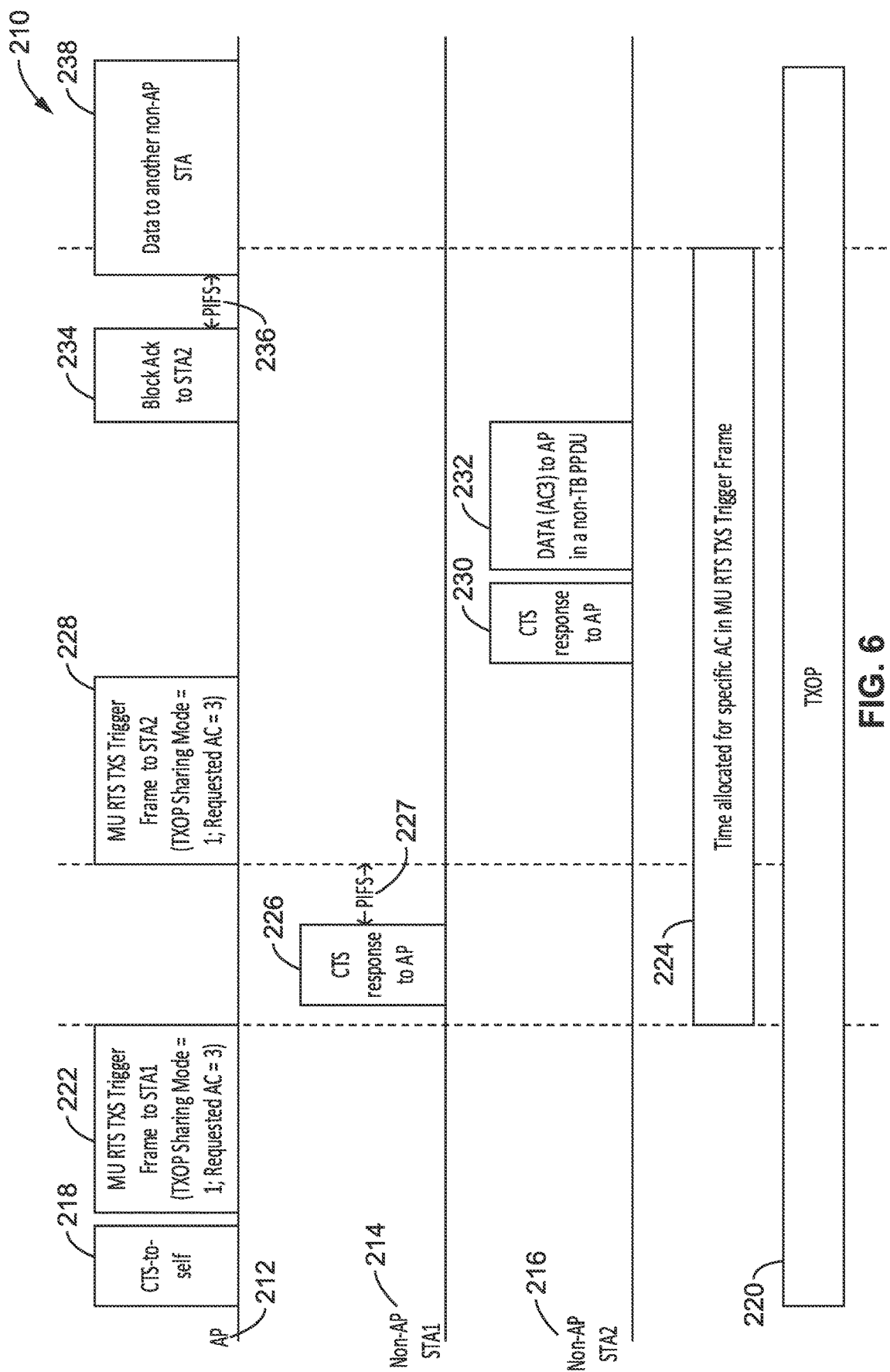
FIG. 6 is a communications diagram of using an MU RTS TXS Trigger frame with TXOP Sharing Mode subfield including a non-AP transmission to a peer non-AP STA, according to at least one embodiment of the present disclosure.

FIG. 6 illustrates an example embodiment 210 of using MU RTS TXS Trigger frame with TXOP Sharing Mode subfield. The example illustrates communications between an AP 212, a non-AP STA1 214 and a non-AP STA2 216, in regard to sharing TXOP 220 and more particularly to the time allocated 224 to a specific AC in the MU RTS TXS Trigger frame.

The EHT AP performs a CTS 218 to self for reserving the TXOP, and then starts allocating time within TXOP 220 to non-AP STA1 to solicit UL PPDU on or above a certain AC level, exemplified here as AC3, by transmitting an MU RTS TXS Trigger frame 222.

After non-AP STA1 receives the MU RTS TXS Trigger frame 222 that is addressed to it, it first responds with a CTS 226 to the AP during allocated time period 224. Since the non-AP STA1 does not have any buffered units with an AC equal to or higher than the Requested AC, it does not transmit any non-TB PPDUs within the time allocation signaled in the MU RTS TXS Trigger frame.

The EHT AP receives the CTS from non-AP STA1, from which it determines that its transmission of an MU RTS TXS Trigger frame was successful. However, after the reception of a CTS from non-AP STA1, the CS mechanism indicates that the medium is idle at the TxPIFS slot boundary, as depicted by PIFS 227. Then the EHT AP may allocate time within the obtained TXOP to non-AP STA2 to solicit a UL PPDU that is at or above a certain AC level, exemplified here as AC3, by transmitting an MU RTS TXS Trigger frame 228 to non-AP STA2.

After non-AP STA2 receives the MU RTS TXS Trigger frame 228 that is addressed to it, it first responds with a CTS 230 to the AP. Then, non-AP STA2 can transmit one or more non-TB PPDUs 232 that satisfy the Requested AC (i.e., AC3) within the time allocation signaled in the MU RTS TXS Trigger frame.

The AP may transmit Block Ack 234 to non-AP STA2 as an immediate response of the reception of UL DATA within the allocated time specified in the MU RTS TXS Trigger frame.

After the AP transmits Block Ack 234 to non-AP STA2, the CS mechanism indicates that the medium is idle at the TxPIFS slot boundary, as indicated by PIFs 236. Then the EHT AP may transmit another PPDU 238 within the obtained TXOP.

5.3. Example 3

Figure 7:
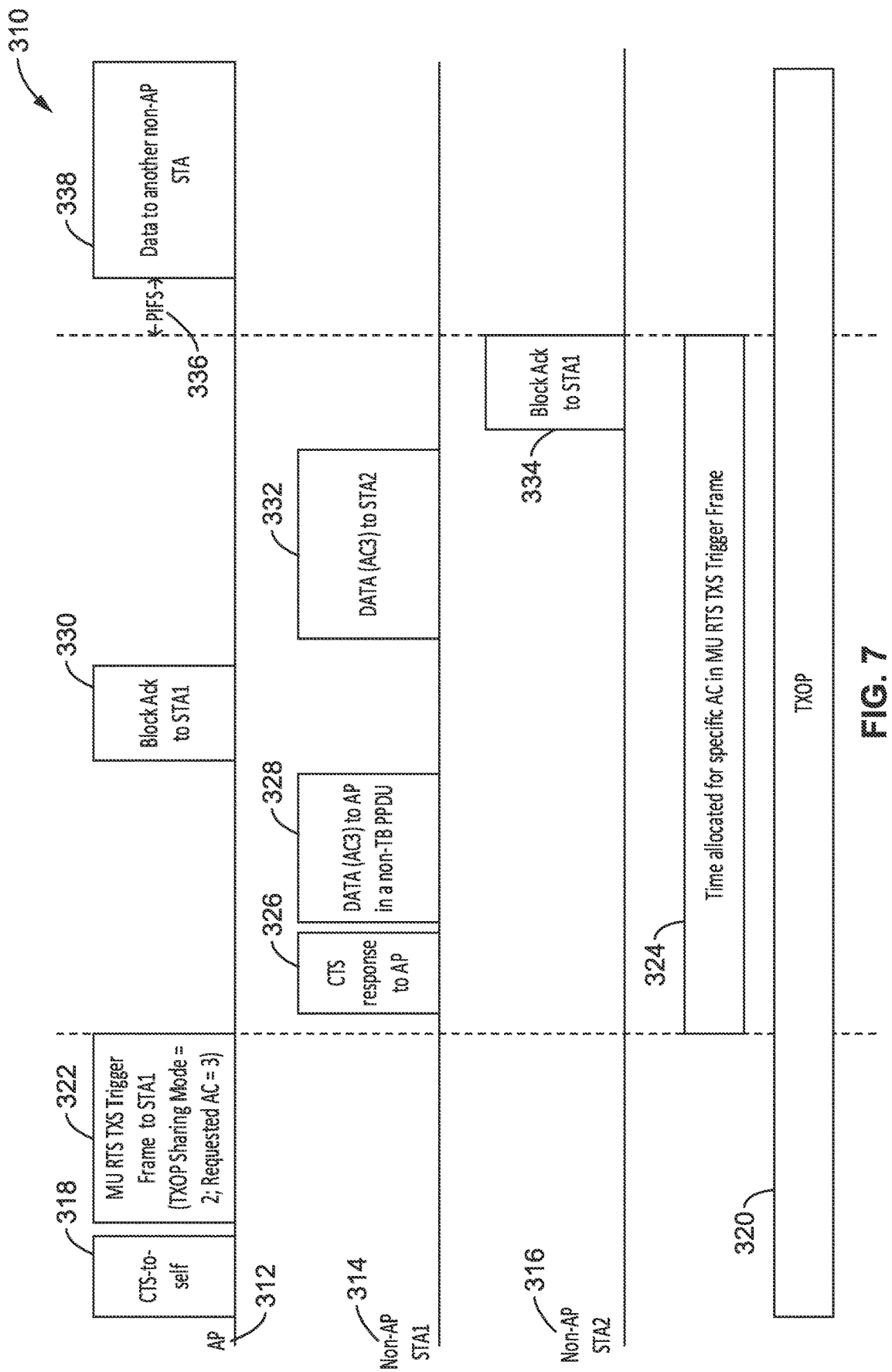
FIG. 7 is a communications diagram of using an MU RTS TXS Trigger frame with TXOP Sharing Mode subfield with the non-AP STA transmitting one or more non-trigger based (non-TB) data units within the time allocation, according to at least one embodiment of the present disclosure.

FIG. 7 illustrates an example embodiment 310 of a MU RTS TXS Trigger frame with TXOP Sharing Mode subfield. Again, the figure depicts communications between an AP 312, a non-AP STA1 314 and a non-AP STA2 316, in regard to sharing TXOP 320 and more particularly to the time allocated 324 to a specific AC in the MU RTS TXS Trigger frame.

In this example the MU RTS TXS Trigger frame with TXOP Sharing Mode subfield value equals to 2 and Requested AC subfield equals to 3 to schedule STA1.

An EHT AP obtains TXOP 320 with CTS 318 to self, and then allocates time 324 within this TXOP to non-AP STA1 to either solicit UL PPDU of AC3 or allow transmission of PPDUs of AC3 to another non-AP STA2 by transmitting an MU RTS TXS Trigger frame 322 to non-AP STA1.

After non-AP STA1 receives the MU RTS TXS Trigger frame 322 that is addressed to it, it first responds with a CTS 326 to the AP. Then, non-AP STA1 may transmit one or more non-TB PPDUs 328 that satisfy the Requested AC, exemplified as AC3, within the time allocation signaled in the MU RTS TXS Trigger frame.

The EHT AP receives the CTS 326 from non-AP STA1, indicating its transmission of an MU RTS TXS Trigger frame has been successful, and the AP may transmit a Block Ack 330 to non-AP STA1 as an immediate response to the reception of UL DATA within the allocated time 324 specified in the MU RTS TXS Trigger frame.

During the time allocated by the EHT AP, the non-AP EHT STA1 may transmit one or more non-TB PPDUs 332 that meet the Requested AC value (AC3) to another non-AP STA2 if the TXOP Sharing Mode subfield value is set to a second state (e.g., "2"), which indicates that the MU-RTS initiates an MU-RTS TXOP sharing procedure wherein a scheduled STA can transmit MPDU(s) addressed to its associated AP or addressed to another STA.

Non-AP STA2 receives DATA 332 from non-AP STA1 and should respond with a Block Ack 334.

After non-AP STA2 transmits the Block Ack frame, the CS mechanism indicates that the medium is idle at the TxP IFS slot boundary, as indicated by PIFS 336. Then the EHT AP may transmit another PPDU 338 within the obtained TXOP.

5.4. Example 4

Figure 8:
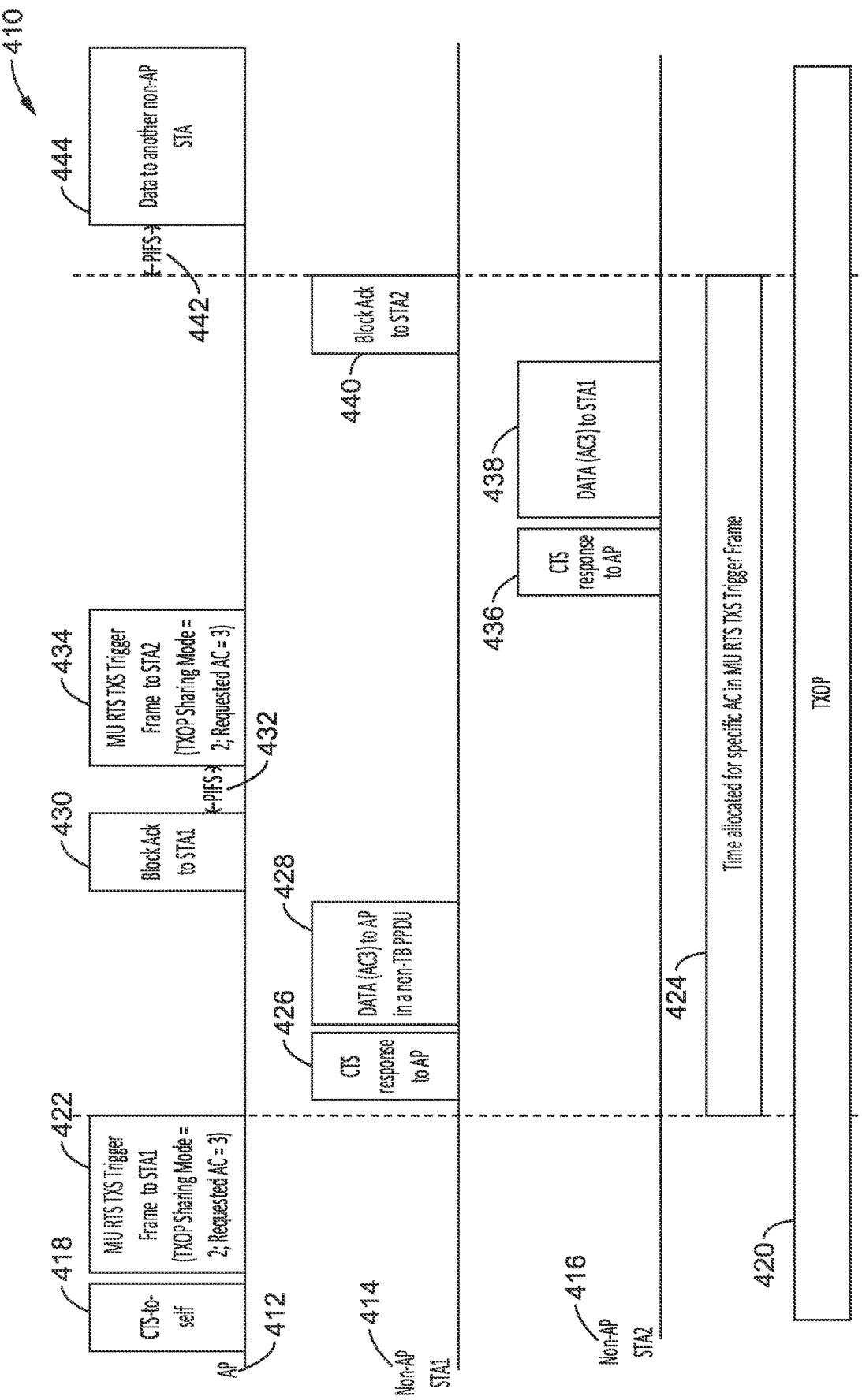
FIG. 8 is a communications diagram of using an MU RTS TXS Trigger frame with TXOP Sharing Mode subfield in which the non-AP STA first responds with a clear-to-send (CTS) to the AP, followed by transmitting one or more non-trigger-based (non-TB) data units within the time allocation, according to at least one embodiment of the present disclosure.

FIG. 8 illustrates an example embodiment 410 of a MU RTS TXS Trigger frame with TXOP Sharing Mode subfield. Again, the figure depicts communications between an AP 412, a non-AP STA1 414 and a non-AP STA2 416, in regard to sharing TXOP 420 and more particularly to the time allocation 424 directed to a specific AC as indicated in the MU RTS TXS Trigger frame.

By way of example and not limitation, the MU RTS TXS Trigger frame with TXOP Sharing Mode subfield value equals to 2 and the Requested AC subfield is exemplified as being equal to 3 to schedule STA1 and STA2.

An EHT AP first obtains the channel with CTS to self 418, and then allocates time 424 within TXOP 420 to non-AP STA1 414 to either solicit UL PPDU of AC3 or allow transmission of PPDUs of AC3 to another non-AP STA2 by transmitting an MU RTS TXS Trigger frame 422 to non-AP STA1.

After non-AP STA1 receives the MU RTS TXS Trigger frame that is addressed to it, it first responds with a CTS 426 to the AP. Then, non-AP STA1 may transmit one or more non-TB PPDUs 428 that satisfy the Requested AC, exemplified as AC3, to the AP within the time allocation signaled in the MU RTS TXS Trigger frame.

The EHT AP receives the CTS and data unit from non-AP STA1, and determines its transmission of an MU RTS TXS Trigger frame has been successful. The AP may transmit a Block Ack 430 to non-AP STA1 as an immediate response to the reception of UL DATA 428 within the allocated time specified in the MU RTS TXS Trigger frame.

During the time allocated 424 by the EHT AP, the non-AP EHT STA1 indicates it does not have any more non-TB PPDU that meets the Requested AC value (AC3) to another non-AP STA2 when the TXOP Sharing Mode subfield value is 2. Then the non-AP EHT STA1 will not transmit any PPDU after receiving the Block Ack from EHT AP.

After the transmission of a Block Ack to non-AP STA1, the CS mechanism indicates that medium is idle at the TxP IFS slot boundary, depicted as PIFS 432. Then the EHT AP may allocate time within the TXOP to non-AP STA2 to either solicit UL PPDU of AC3 or allow transmission of PPDUs of AC3 to another non-AP STA1 by transmitting an MU RTS TXS Trigger frame 434 to non-AP STA2.

After non-AP STA2 receives the MU RTS TXS Trigger frame that is addressed to it, it first responds with CTS 436. Then, non-AP STA2 will not transmit any non-TB PPDUs to EHT AP if the buffered units to the AP would be unable to satisfy the Requested AC (i.e., AC3) within the time allocation signaled in the MU RTS TXS Trigger frame. The non-AP STA2 may transmit one or more non-TB PPDUs 438 that satisfy the Requested AC (i.e., AC3) to another non-AP STA1 within the time allocation signaled in the MU RTS TXS Trigger frame.

The non-AP STA1 receives data unit 438 from non-AP STA2 and should respond with a Block Ack 440 to non-AP STA2.

After non-AP STA1 sends the Block Ack frame, the CS mechanism indicates that the medium is idle at the TxP IFS slot boundary, as indicated by PIFS 442. Then the EHT AP may transmit another PPDU 444 within the obtained TXOP.

6. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following.

An apparatus for wireless communication in a network, the apparatus comprising: (a) a wireless communication station (STA) performing transmission of frames over a channel between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless STAs using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol, comprising: (d)(i) obtaining a transmit opportunity (TXOP) by the STA operating as an AP STA; (d)(ii) allocating time within said TXOP by said AP STA with one or more non-AP STAs in response to satisfying access class (AC) requirements; (d)(iii) transmitting a frame by said AP STA, wherein said frame indicates requested AC requirements, to be met by one of the one or more non-AP STAs for utilizing the allocated time in the TXOP; (d)(iv) receiving a response back from one of the one or more non-AP STAs which has received said frame indicating requested AC requirements as transmitted by said AP STA; (d)(v) wherein said response received by the AP STA indicates whether the requested AC requirements will be met by the non-AP STA; and (d)(vi) wherein if the requested AC requirements are met by the non-AP STA, then the non-AP STA will proceed with accessing the network and transmitting data having the requested AC requirements.

An apparatus for wireless communication in a network, the apparatus comprising: (a) a wireless communication station (STA) performing transmission of frames between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless STAs using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol, comprising: (d)(i) obtaining a transmit opportunity (TXOP) by the STA operating as an AP STA; (d)(ii) allocating time within said TXOP by said AP STA with one or more non-AP STAs in response to satisfying access class (AC) requirements; (d)(iii) transmitting a frame by said AP STA, wherein said frame indicates requested AC requirements, to be met by one of the one or more non-AP STAs for utilizing the allocated time in the TXOP; (d)(iv) receiving a response back from one of the one or more non-AP STAs which has received said frame indicating requested AC requirements as transmitted by said AP STA; (d)(v) wherein said response received by the AP STA indicates whether the requested AC requirements will be met by the non-AP STA; (d)(vi) wherein if the requested AC requirements are met by the non-AP STA, then the non-AP STA will proceed with accessing the network and transmitting data having the requested AC requirements; (d)(vii) wherein said frame as sent by said AP STA, indicating requested AC requirements, comprises either (A) a trigger frame which may be configured to meet high-efficiency (HT) and/or extra-high throughput (EHT) according to IEEE 802.11 standards; or a multi-user (MU) ready-to-send (RTS) TXOP sharing (TXS) trigger frame; (d)(viii) wherein said response to be received by said AP STA, from the one or more non-AP STAs receiving said frame indicating requested AC requirements, comprises a clear-to-send (CTS) frame which indicates whether the requested AC requirements are to be met by the non-AP STA; and (d)(ix) wherein if the requested AC requirements are not met by the non-AP STA, then the AP STA communicates a frame, indicating requested AC requirements, to a different non-AP STA offering allocated time within said TXOP if the requested AC requirements can be met.

A method of performing wireless communication in a network, comprising: (a) performing communications on a wireless network with stations (STA) transmitting frames between the medium access control (MAC) layers of an IEEE 802.11 network having separate STAs and/or STAs within a multiple-link device (MLD), and operating as either a regular STA or an Access Point (AP) STA, for wirelessly communicating with other wireless STAs using a carrier sense multiple access/collision avoidance (CSMA/CA) mechanism on a wireless local area network (WLAN) in which enhanced distributed channel access (EDCA) is utilized for random channel access on all the links; (b) obtaining a transmit opportunity (TXOP) by the STA operating as an AP STA; (c) allocating time within said TXOP by said AP STA with one or more non-AP STAs in response to satisfying access class (AC) requirements; (d) transmitting a frame by said AP STA, wherein said frame indicates requested AC requirements, to be met by one of the one or more non-AP STAs for utilizing the allocated time in the TXOP; (e) receiving a response back from one of the one or more non-AP STAs which has received said frame indicating requested AC requirements as transmitted by said AP STA; (f) wherein said response received by the AP STA indicates whether the requested AC requirements will be met by the non-AP STA; and (g) wherein if the requested AC requirements are met by the non-AP STA, then the non-AP STA will proceed with accessing the network and transmitting data having the requested AC requirements.

The apparatus or method of any preceding implementation, wherein said frame as sent by said AP STA, indicating requested AC requirements, comprises a trigger frame which may be configured to meet high-efficiency (HT) and/or extra-high throughput (EHT) according to IEEE 802.11 standards.

The apparatus or method of any preceding implementation, wherein said frame as sent by said AP STA, indicating requested AC requirements, comprises a multi-user (MU) ready-to-send (RTS) TXOP sharing (TXS) trigger frame.

The apparatus or method of any preceding implementation, wherein said response to be received by said AP STA, from the one or more non-AP STAs receiving said frame indicating requested AC requirements, comprises a clear-to-send (CTS) frame which indicates whether the requested AC requirements are to be met by the non-AP STA.

The apparatus or method of any preceding implementation, wherein if the requested AC requirements are not met by the non-AP STA, then the AP STA communicates a frame, indicating requested AC requirements, to a different non-AP STA offering allocated time within said TXOP if the requested AC requirements can be met.

The apparatus or method of any preceding implementation, wherein said data transmitted by the non-AP STA comprises data being uploaded to the AP STA, or data sent to another non-AP STA.

The apparatus or method of any preceding implementation, wherein queued data packets of said non-AP STA are considered to meet said AC requirements if one or more data packets in the EDCA queue have an AC value that is equal to, or higher than, the requested AC requirements as transmitted by the AP STA.

The apparatus or method of any preceding implementation, wherein queued data packets of said non-AP STA are not considered to meet said AC requirements, if these data packets in the EDCA queue have AC values which are less than the requested AC requirements as transmitted by the AP STA.

The apparatus or method of any preceding implementation, wherein sharing of the TXOP by the AP STA is prevented if the TXOP sharing mode subfield value is equal to a value which indicates this sharing is not allowed, as indicated in the frame indicating the requested AC requirements.

The apparatus or method of any preceding implementation, wherein the non-AP STA accesses the channel during shared TXOP to transmit MPDUs that meet the requested AP requirements indicated in the frame indicating the requested AC requirements to associated AP only if the TXOP sharing mode subfield value equals to a first state; or to associated AP or another STA if the TXOP Sharing Mode subfield value equals to a second state.

The apparatus or method of any preceding implementation, further comprising communicating a multiple transmission identification (TID) aggregation-MAC protocol data units (A-MPDU) limit subfield in the frame indicating requested AC requirements as sent by the AP STA; and wherein said TID A-MPDU limit subfield indicates a number of MPDUs allowed in an A-MPDU and a maximum number of TIDs that can be aggregated by the non-AP STA in the A-MPDU.

The apparatus or method of any preceding implementation, wherein a non-AP STA transmitting a multiple-TID A-MPDU in the allocated time as indicated by the frame containing the requested AC value indicated, should aggregate data units in the following order: (i) first, any and all MPDUs that correspond to the requested AC subfield of the user information field of the frame addressed to the non-AP STA containing said requested AC value; (ii) followed by any and all MPDUs that correspond to any AC that has a higher priority than the requested AC; and (iii) wherein the non-AP STA does not aggregate any MPDUs corresponding to any AC that has a lower priority than the requested AC.

The apparatus or method of any preceding implementation, wherein a non-AP STA which transmits a single-TID A-MPDU in the allocated time as indicated by the frame containing said requested AC value aggregates data frames in the following order: (i) a TID that corresponds to said requested AC subfield addressed to the non-AP STA; (ii) if condition (i) cannot be met, then said non-AP STA aggregates data frames having a TID that corresponds to any AC that has a higher priority than said requested AC; and (iii) wherein the non-AP STA does not aggregate any MPDUs corresponding to any AC that has lower priority than said requested AC.

The apparatus or method of any preceding implementation, wherein said requested AC subfield as and said TID aggregation limit subfield is carried in a trigger dependent user info subfield, which is not present in the user information field of a trigger frame.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially"

aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication station (STA) performing transmission of frames over a channel between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless STAs using a carrier sense multiple access/collision avoidance (CSMA/CA) mechanism on a wireless local area network (WLAN) in which enhanced distributed channel access (EDCA) is utilized for random channel access on all the links;
   (b) a processor coupled to said wireless communication circuit for operating on the WLAN;
   (c) a non-transitory memory storing instructions executable by the processor for communicating with other STAs; and
   (d) wherein said instructions, when executed by the processor, perform steps of a wireless communications protocol, comprising:
      (i) obtaining a transmit opportunity (TXOP) by the STA operating as an AP STA;
      (ii) allocating time within said TXOP by said AP STA with one or more non-AP STAs in response to satisfying access class (AC) requirements;
      (iii) transmitting a frame by said AP STA, wherein said frame indicates requested AC requirements, to be met by one of the one or more non-AP STAs for utilizing the allocated time in the TXOP;
      (iv) receiving a response back from one of the one or more non-AP STAs which has received said frame indicating requested AC requirements as transmitted by said AP STA;
      (v) wherein said response received by the AP STA indicates whether the requested AC requirements will be met by the non-AP STA; and
      (vi) wherein if the requested AC requirements are met by the non-AP STA, then the non-AP STA will proceed with accessing the network and transmitting data having the requested AC requirements.

2. The apparatus of claim 1, wherein said frame as sent by said AP STA, indicating requested AC requirements, comprises a trigger frame which may be configured to meet high-efficiency (HT) and/or extra-high throughput (EHT) according to IEEE 802.11 standards.

3. The apparatus of claim 1, wherein said frame as sent by said AP STA, indicating requested AC requirements, comprises a multi-user (MU) ready-to-send (RTS) TXOP sharing (TXS) trigger frame.

4. The apparatus of claim 1, wherein said response to be received by said AP STA, from the one or more non-AP STAs receiving said frame indicating requested AC requirements, comprises a clear-to-send (CTS) frame which indicates whether the requested AC requirements are to be met by the non-AP STA.

5. The apparatus of claim 1, wherein if the requested AC requirements are not met by the non-AP STA, then the AP STA communicates a frame, indicating requested AC requirements, to a different non-AP STA offering allocated time within said TXOP if the requested AC requirements can be met.

6. The apparatus of claim 1, wherein said data transmitted by the non-AP STA comprises data being uploaded to the AP STA, or data sent to another non-AP STA.

7. The apparatus of claim 1, wherein queued data packets of said non-AP STA are considered to meet said AC requirements if one or more data packets in the EDCA queue have an AC value that is equal to, or higher than, the requested AC requirements as transmitted by the AP STA.

8. The apparatus of claim 1, wherein queued data packets of said non-AP STA are not considered to meet said AC requirements, if these data packets in the EDCA queue have AC values which are less than the requested AC requirements as transmitted by the AP STA.

9. The apparatus of claim 1, wherein sharing of the TXOP by the AP STA is prevented if the TXOP sharing mode subfield value is equal to a value which indicates this sharing is not allowed, as indicated in the frame indicating the requested AC requirements.

10. The apparatus of claim 1, wherein the non-AP STA accesses the channel during shared TXOP to transmit MPDUs that meet the requested AP requirements indicated in the frame indicating the requested AC requirements to associated AP only if the TXOP sharing mode subfield value equals to a first state; or to associated AP or another STA if the TXOP Sharing Mode subfield value equals to a second state.

11. The apparatus of claim 1, further comprising communicating a multiple transmission identification (TID) aggregation-MAC protocol data units (A-MPDU) limit subfield in the frame indicating requested AC requirements as sent by the AP STA; and wherein said TID A-MPDU limit subfield indicates a number of MPDUs allowed in an A-MPDU and a maximum number of TIDs that can be aggregated by the non-AP STA in the A-MPDU.

12. The apparatus of claim 11, wherein a non-AP STA transmitting a multiple-TID A-MPDU in the allocated time as indicated by the frame containing the requested AC value indicated, should aggregate data units in the following order: (i) first, any and all MPDUs that correspond to the requested AC subfield of the user information field of the frame addressed to the non-AP STA containing said requested AC value; (ii) followed by any and all MPDUs that correspond to any AC that has a higher priority than the requested AC; and (iii) wherein the non-AP STA does not aggregate any MPDUs corresponding to any AC that has a lower priority than the requested AC.

13. The apparatus of claim 11, wherein a non-AP STA which transmits a single-TID A-MPDU in the allocated time as indicated by the frame containing said requested AC value aggregates data frames in the following order: (i) a TID that corresponds to said requested AC subfield addressed to the non-AP STA; (ii) if condition (i) cannot be met, then said non-AP STA aggregates data frames having a TID that corresponds to any AC that has a higher priority than said requested AC; and (iii) wherein the non-AP STA does not aggregate any MPDUs corresponding to any AC that has lower priority than said requested AC.

14. The apparatus of claim 11, wherein said requested AC subfield as and said TID aggregation limit subfield is carried in a trigger dependent user info subfield, which is not present in the user information field of a trigger frame.

15. An apparatus for wireless communication in a network, the apparatus comprising:

(a) a wireless communication station (STA) performing transmission of frames between the medium access control (MAC) layers of an IEEE 802.11 network as a wireless station (STA) which is a separate STA or as a STA in a multiple-link device (MLD), and operating as either a regular STA or an Access Point (AP) STA, for wirelessly communicating with other wireless STAs using a carrier sense multiple access/collision avoidance (CSMA/CA) mechanism on a wireless local area network (WLAN) in which enhanced distributed channel access (EDCA) is utilized for random channel access on all the links;

(b) a processor coupled to said wireless communication circuit for operating on the WLAN;

(c) a non-transitory memory storing instructions executable by the processor for communicating with other STAs; and (d) wherein said instructions, when executed by the processor, perform steps of a wireless communications protocol, comprising:
  (i) obtaining a transmit opportunity (TXOP) by the STA operating as an AP STA;
  (ii) allocating time within said TXOP by said AP STA with one or more non-AP STAs in response to satisfying access class (AC) requirements;
  (iii) transmitting a frame by said AP STA, wherein said frame indicates requested AC requirements, to be met by one of the one or more non-AP STAs for utilizing the allocated time in the TXOP;
  (iv) receiving a response back from one of the one or more non-AP STAs which has received said frame indicating requested AC requirements as transmitted by said AP STA;
  (v) wherein said response received by the AP STA indicates whether the requested AC requirements will be met by the non-AP STA;
  (vi) wherein if the requested AC requirements are met by the non-AP STA, then the non-AP STA will proceed with accessing the network and transmitting data having the requested AC requirements;
  (vii) wherein said frame as sent by said AP STA, indicating requested AC requirements, comprises either (A) a trigger frame which may be configured to meet high-efficiency (HT) and/or extra-high throughput (EHT) according to IEEE 802.11 standards; or a multi-user (MU) ready-to-send (RTS) TXOP sharing (TXS) trigger frame;
  (viii) wherein said response to be received by said AP STA, from the one or more non-AP STAs receiving said frame indicating requested AC requirements, comprises a clear-to-send (CTS) frame which indicates whether the requested AC requirements are to be met by the non-AP STA; and
  (ix) wherein if the requested AC requirements are not met by the non-AP STA, then the AP STA communicates a frame, indicating requested AC requirements, to a different non-AP STA offering allocated time within said TXOP if the requested AC requirements can be met.

16. The apparatus of claim 15, wherein said data transmitted by the non-AP STA comprises data being uploaded to the AP STA, or data sent to another non-AP STA.

17. The apparatus of claim 15, wherein queued data packets of said non-AP STA is considered to meet said AC requirements if one or more data packets in the EDCA queue have an AC value that is equal or higher than the requested AC requirements as transmitted by the AP STA.

18. The apparatus of claim 15, wherein queued data packets of said non-AP STA are not considered to meet said AC requirements if these data packets in the EDCA queue have AC values less than the requested AC requirements as transmitted by the AP STA.

19. The apparatus of claim 15, wherein sharing of the TXOP by the AP STA is prevented if the TXOP sharing mode subfield value is set to indicate that sharing is prevented as indicated in the frame indicating the requested AC requirements.

20. The apparatus of claim 15, wherein the non-AP STA access channel during shared TXOP to transmit MPDUs that meet the requested AP requirements indicated in the frame indicating the requested AC requirements to associated AP only if the TXOP Sharing Mode subfield value equals to a first state; or to associated AP or another STA if the TXOP Sharing Mode subfield value equals to a second state.

21. The apparatus of claim 15, further comprising communicating multiple transmission identification (TID) aggregation-MAC protocol data units (A-MPDU) limit subfield in the frame indicating requested AC requirements as sent by the AP STA; and wherein said TID A-MPDU limit subfield indicates a number of MPDUs allowed in an A-MPDU and the maximum number of TIDs that can be aggregated by the non-AP STA in the A-MPDU.

22. The apparatus of claim 21, wherein a non-AP STA transmitting a multiple-TID A-MPDU in the allocated time as indicated by the frame containing the requested AC value indicated, should aggregate data units in the following order: (i) first, any and all MPDUs that correspond to the requested AC subfield of the user info field of the frame addressed to the non-AP STA containing said requested AC value; (ii) followed by any and all MPDUs that correspond to any AC that has a higher priority than the requested AC; and (iii) wherein the non-AP STA does not aggregate any MPDUs corresponding to any AC that has a lower priority than the requested AC.

23. The apparatus of claim 21, wherein a non-AP STA which transmits a single-TID A-MPDU in the allocated time as indicated by the frame containing said requested AC value aggregate data frames in the following order: (i) a TID that corresponds to said requested AC subfield addressed to the non-AP STA; (ii) if condition (i) cannot be met, then said non-AP STA aggregates data frames having a TID that corresponds to any AC that has a higher priority than said requested AC; and (iii) wherein the non-AP STA does not aggregate any MPDUs corresponding to any AC that has lower priority than said requested AC.

24. The apparatus of claim 21, wherein said requested AC subfield and said TID aggregation limit subfield is carried in a trigger dependent user info subfield, which is not present in the user information field of a trigger frame.

25. A method of performing wireless communication in a network, comprising:
  (a) performing communications on a wireless network with stations (STA) transmitting frames between the medium access control (MAC) layers of an IEEE 802.11 network having separate STAs and/or STAs within a multiple-link device (MLD), and operating as either a regular STA or an Access Point (AP) STA, for wirelessly communicating with other wireless STAs using a carrier sense multiple access/collision avoidance (CSMA/CA) mechanism on a wireless local area network (WLAN) in which enhanced distributed channel access (EDCA) is utilized for random channel access on all the links;
  (b) obtaining a transmit opportunity (TXOP) by the STA operating as an AP STA;
  (c) allocating time within said TXOP by said AP STA with one or more non-AP STAs in response to satisfying access class (AC) requirements;
  (d) transmitting a frame by said AP STA, wherein said frame indicates requested AC requirements, to be met by one of the one or more non-AP STAs for utilizing the allocated time in the TXOP;
  (e) receiving a response back from one of the one or more non-AP STAs which has received said frame indicating requested AC requirements as transmitted by said AP STA;
  (f) wherein said response received by the AP STA indicates whether the requested AC requirements will be met by the non-AP STA; and
  (g) wherein if the requested AC requirements are met by the non-AP STA, then the non-AP STA will proceed with accessing the network and transmitting data having the requested AC requirements.

* * * * *